Feb. 14, 1967  E. O. BLODGETT  3,304,411
PUNCHED-CARD READER
Filed Jan. 3, 1963  9 Sheets-Sheet 1
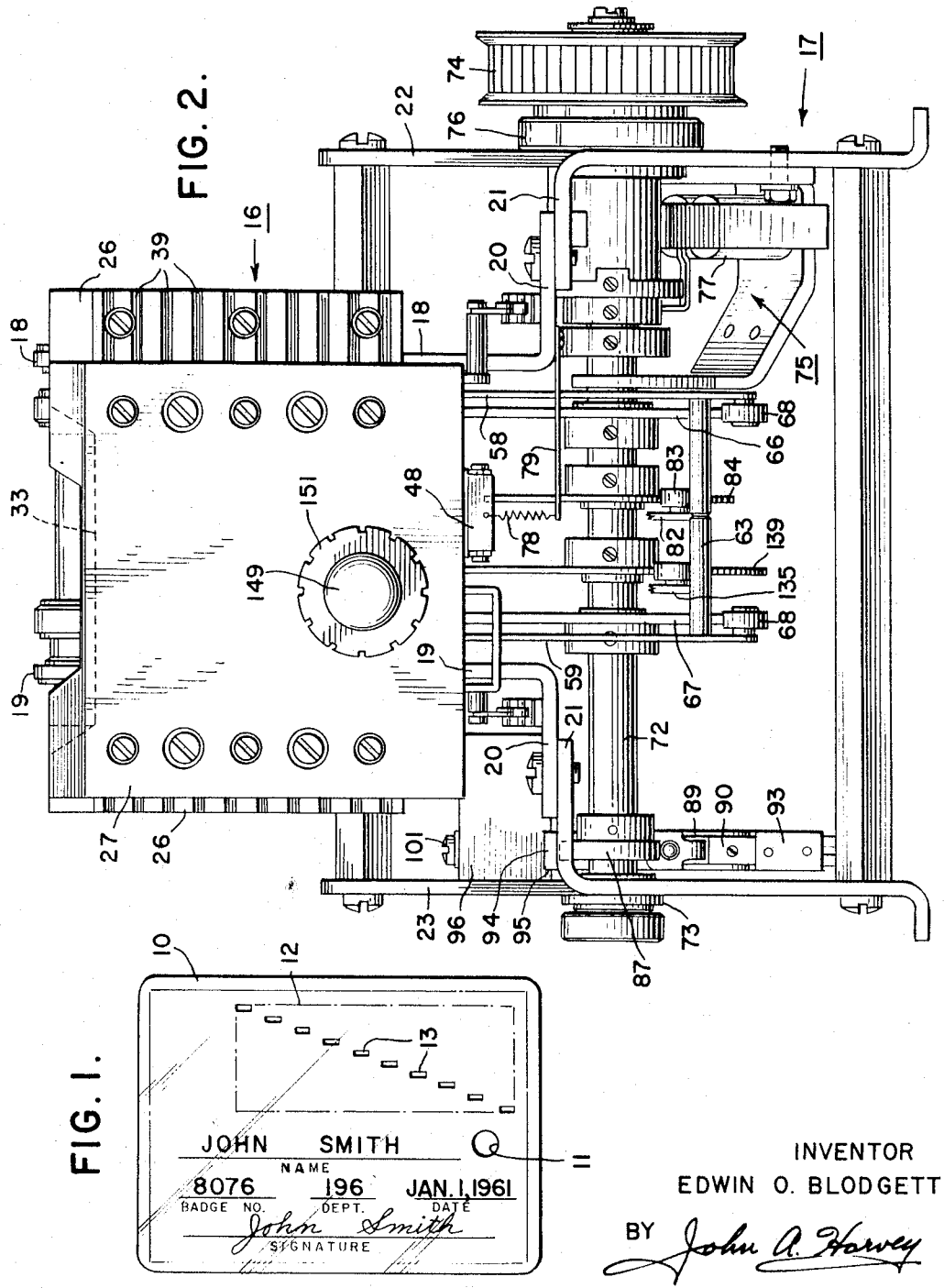
INVENTOR
EDWIN O. BLODGETT
BY *John A. Harvey*
ATTORNEY

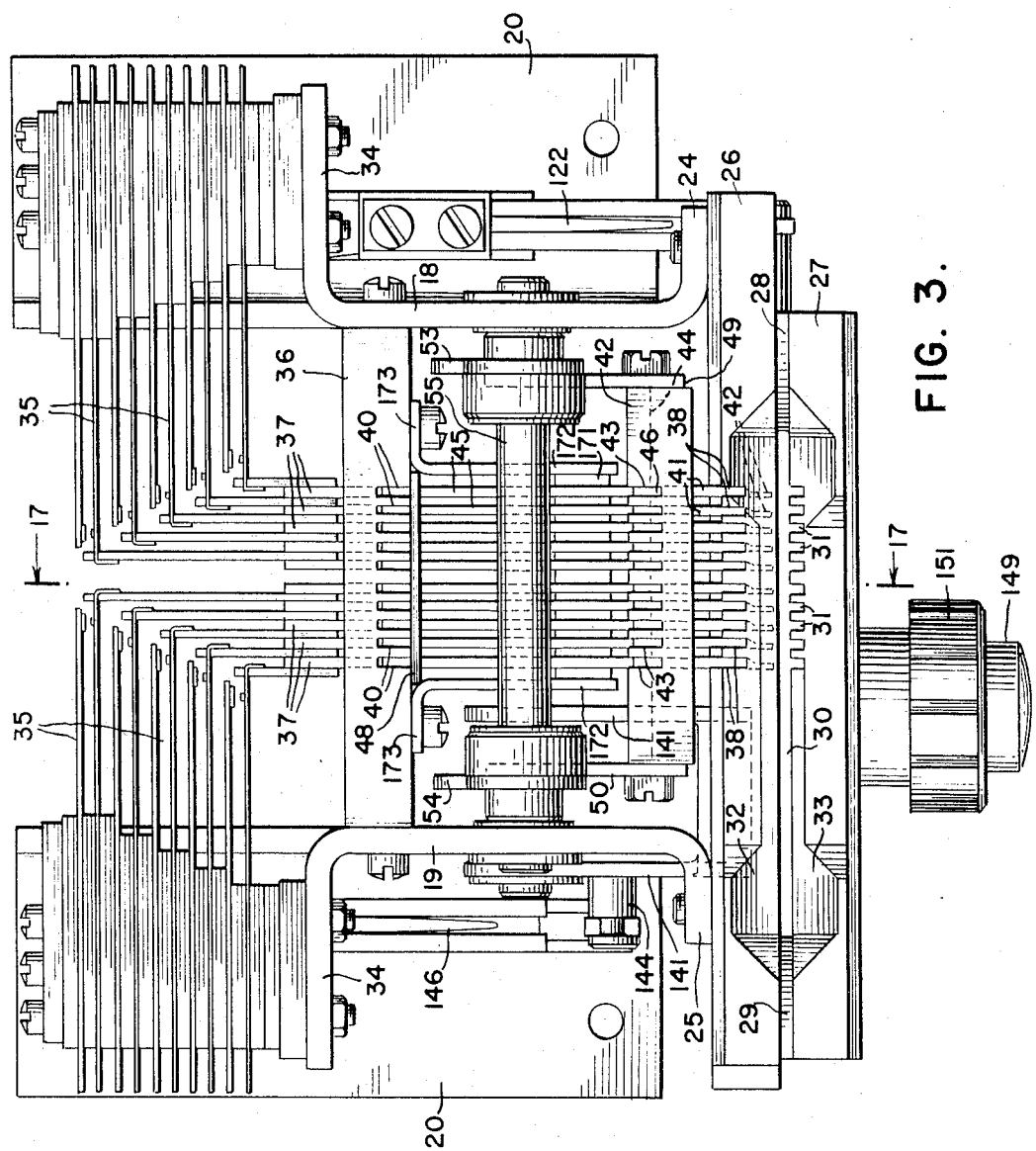

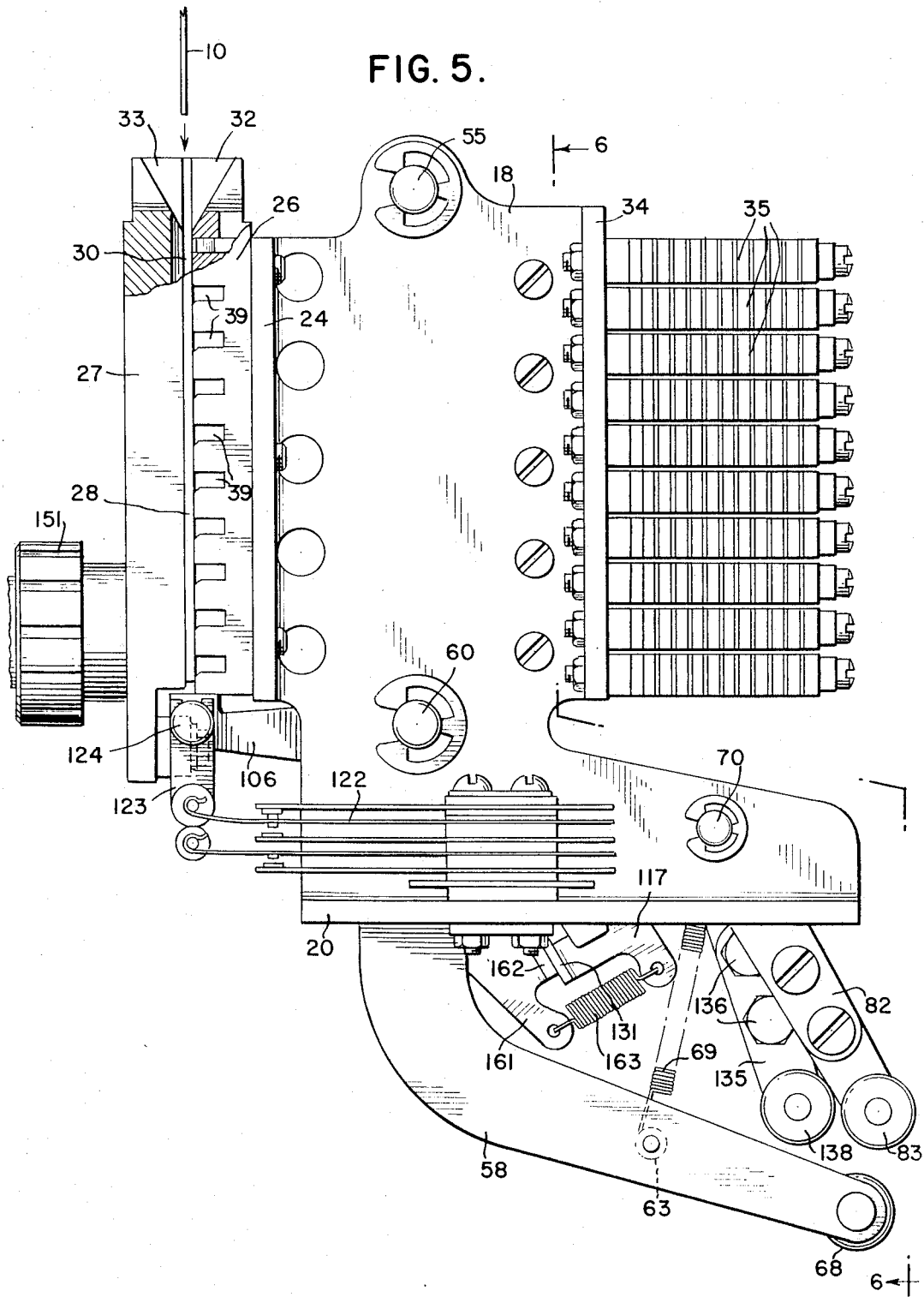

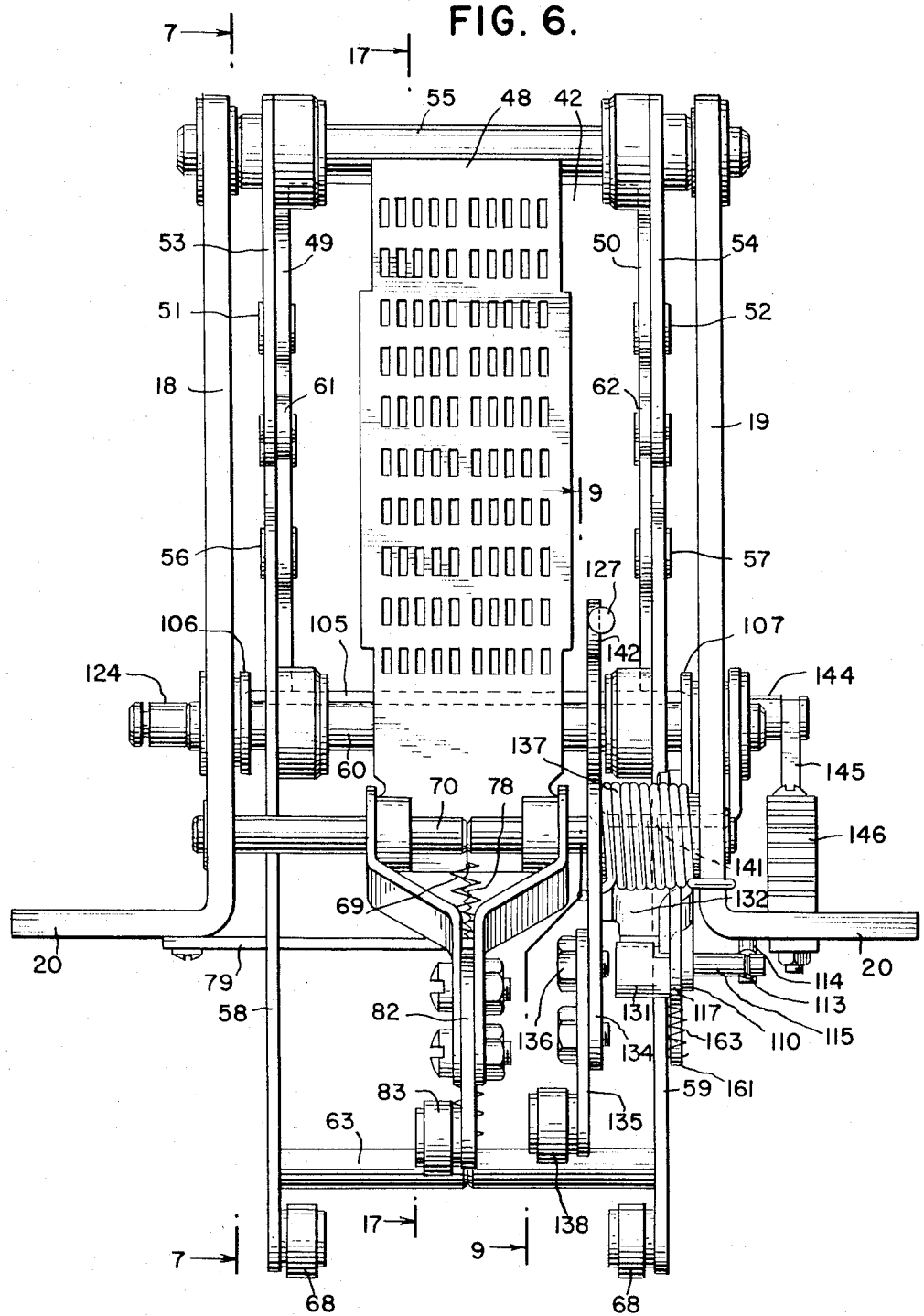

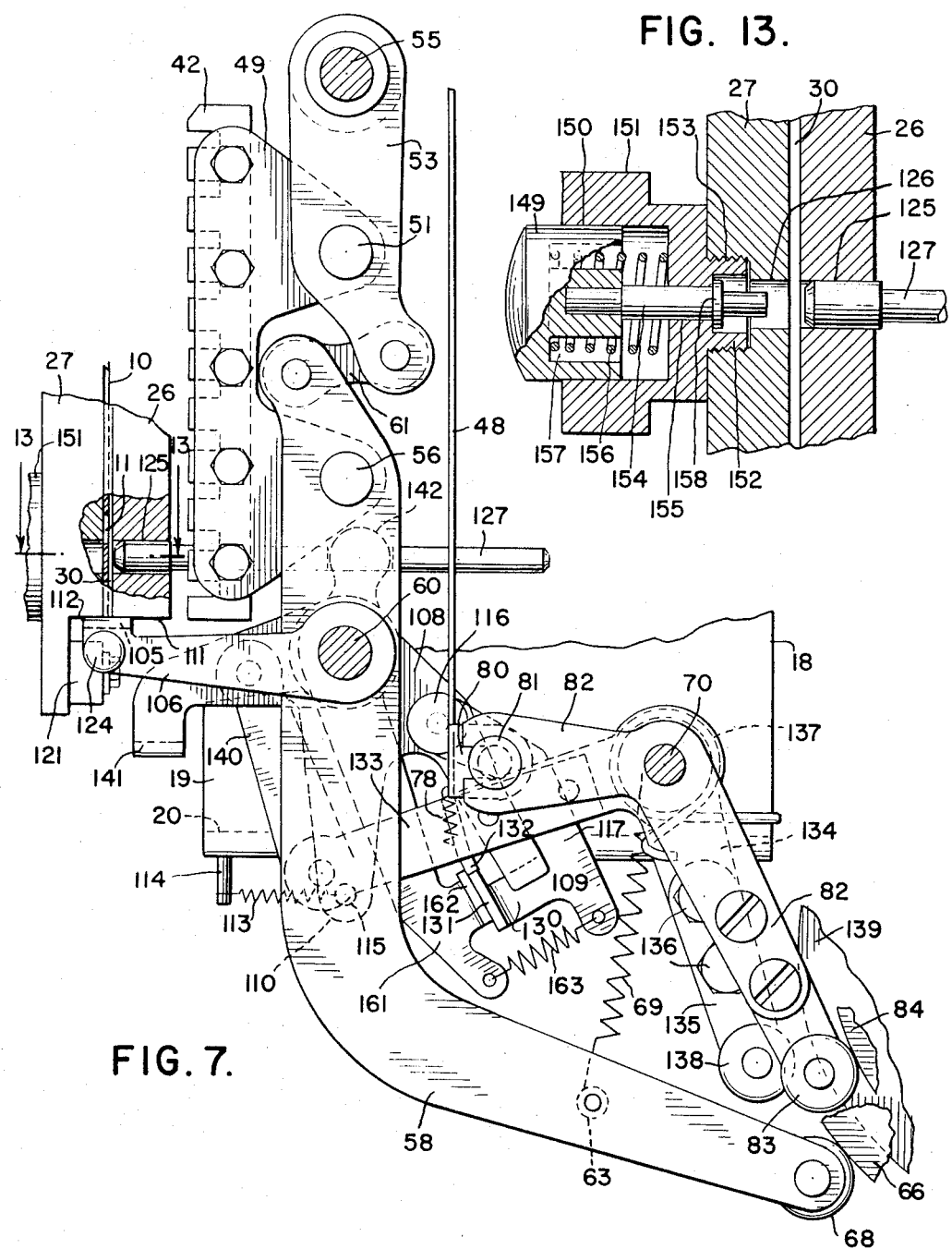

Feb. 14, 1967   E. O. BLODGETT   3,304,411
PUNCHED-CARD READER
Filed Jan. 3, 1963   9 Sheets-Sheet 7
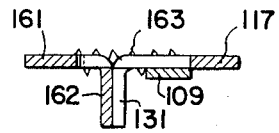
FIG. 15.
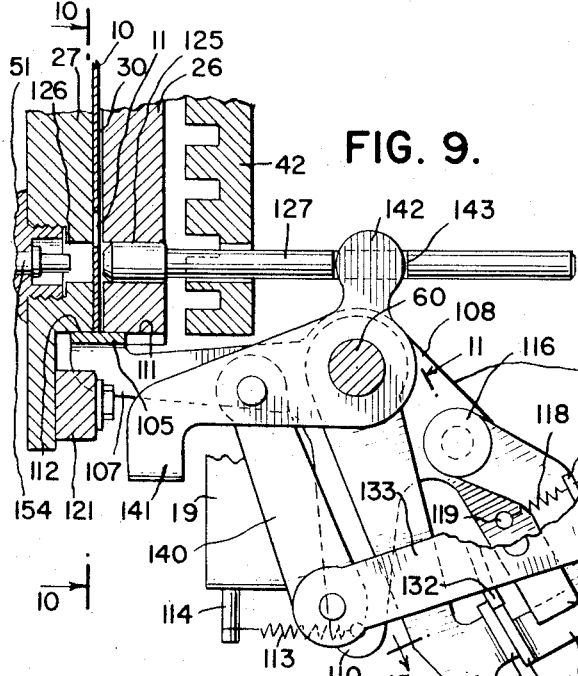
FIG. 9.   FIG. 11.
FIG. 12.   FIG. 14.   FIG. 16.
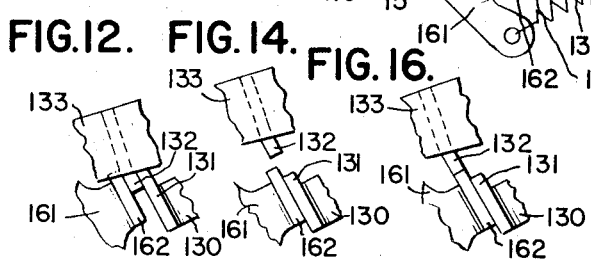
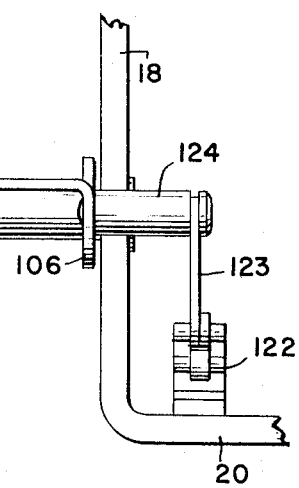
FIG. 10.

Feb. 14, 1967  E. O. BLODGETT  3,304,411

PUNCHED-CARD READER

Filed Jan. 3, 1963  9 Sheets-Sheet 9

United States Patent Office 3,304,411
Patented Feb. 14, 1967

3,304,411
PUNCHED-CARD READER
Edwin O. Blodgett, Rochester, N.Y., assignor, by mesne
assignments, to Friden, Inc., San Leandro, Calif., a corporation of Delaware
Filed Jan. 3, 1963, Ser. No. 249,252
18 Claims. (Cl. 235—61.11)

The present invention relates to coded-information punched-card readers and, particularly, to readers which in one card reading cycle of operation read and temporarily retain all of the coded information recorded in a card. While the invention has utility in numerous and diverse applications, it has particular utility in reading punched cards of smaller physical size than the present-day standard tabulating card and will be described in that connection.

It is often desirable to record information by code punching a card record medium fabricated of relatively thin material such as tabulating-card paper stock, sheet plastic, or paper stock laminated between sheets of plastic material. The card, depending upon the application, may be flexible or semi-flexible or may even be relatively rigid. It has a surface area allocated to punch-code index points pre-arranged in columns and rows. The term "index point" conventionally refers to a pre-arranged point on the card surface where a code aperture may be punched, and alpha-numeric characters or symbols are represented by one or more index-point code apertures punched in individual index-point columns. Such cards provide convenient, easily handled unit records as typified by conventional tabulating cards used for business accounting and statistical purposes. Punched cards having a physical size smaller than that of standard tabulating cards are often used for special accounting applications, in lieu of the larger standard card, such as product sales tags to facilitate sales accounting in retail establishments, as personnel identification badges, and for many other similar applications.

Punch-card readers may read the card as the latter moves in transit and at constant velocity past a suitable aperture-sensing structure, or the card may be moved into reading position and halted while the entire card is read mechanically by an appropriate array of aperture sensing pins. The coded-information read from each card may be used as it is read, or it may be temporarily stored by mechanical or electrical structures awaiting use.

It is an object of the present invention to provide a new and improved coded-information punched-card reader which mechanically reads in entirety and effectively electrically stored, with prolonged and high accuracy, all information punch recorded in a card.

It is a further object of the invention to provide a novel coded-information punched-card reader having for each card read a single and relatively rapid reading cycle of operation, and one wherein all information read from each card during a reading cycle is placed into a form of electrical storage where it remains accurately and permanently stored and available for use until the next succeeding reading cycle even though such succeeding cycle may be quite remote in point of time.

It is an additional object of the invention to provide a coded-information punched-card reader of substantially simplified and improved construction having relatively low initial and maintenance costs, and one exhibiting high operational reliability and accuracy over prolonged periods of operation.

It is yet another object of the invention to provide a coded-information punched-card reader which not only has a very sturdy, foolproof and compact construction but possesses such operational safeguards as permit reliable use by entirely unskilled persons.

Other objects and advantages of the invention will appear as a detailed description thereof proceeds in the light of the drawing forming a part of this application, and in which:

FIG. 1 illustrates a conventional form of coded information punched card, in the nature of an identification badge, which the reader disclosed and described herein is adapted to read;

FIG. 2 is a front elevational view, FIG. 3 is a top view, FIG. 4 a rear elevational view, and FIG. 5 a side elevational view illustrating the construction of a punched-card reader embodying the present invention in a particular form;

FIG. 6 is an elevational cross-sectional view taken along the planes 6—6 of FIG. 5;

FIG. 7 is a partial elevational view taken along the plane 7—7 of FIG. 4 to illustrate more clearly certain latching structures and their control over cam and cam-follower actuated reader components;

Figure 8:
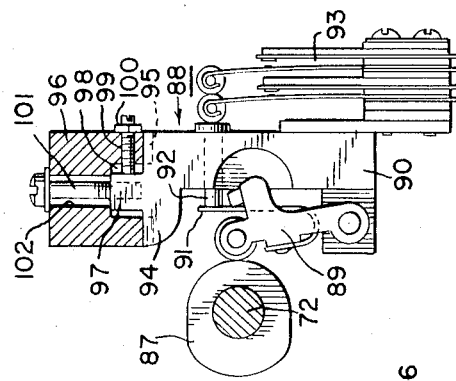
FIG. 8 is a fragmentary elevational cross-sectional view taken along the plane 8—8 of FIG. 4.

FIGS. 9-16 are fragmentary views further illustrating in more detail the constructions of the latching structures last mentioned, together with certain features of their operations; and FIGS. 17-22 are enlarged cross-sectional and isometric views illustrating the detail constructions of code aperture sensing components utilized in the reader and to illustrate operating features of these components.

The coded-information punched-card reader embodying the present invention is hereinafter described by way of example as one used to read a personnel identification badge of the type illustrated in FIG. 1. This type of identification badge is ordinarily comprised by thin cardboard stock material, upon which is printed and written pertinent information concerning the badge holder, laminated with and sealed between transparent plastic sheet material. The badge 10 as thus fabricated is provided with an off-center aperture 11 for a purpose presently to be explained, and an area 12 outlined in broken lines is reserved for information code punching in ten rows of ten columns of index points. The information conveniently recorded is the badge number, although additional information may be recorded if desired. Purely by way of example, the badge here illustrated is shown as having successive columns (successively arranged from left to right as seen in FIG. 1) of index points punched in successively higher valued rows of index points by use of rectangular apertures 13 such as are employed in conventional present day tabulating cards using the Holderith tabulating code. It will be understood that the aperture 11 and information code apertures 13 are punched completely through the laminated card 10 after it has been fabricated.

The construction of a reader embodying the present invention, and adapted to read the coded information punch recorded in the badge of FIG. 1, is illustrated in FIGS. 2-5. It is conveniently fabricated in two subassemblies 16 and 17 of which the upper subassembly 16 includes side plates 18 and 19 having turned over bottom flanges 20 assembled by machine screws as shown to turned in intermediate flange portions 21 of side plates 22 and 23 included in the subassembly 17. As illustrated more clearly in FIG. 3, the side plates 18 and 19 of the subassambly 16 are provided along their forward edge by turned out flanges 24 and 25 which are secured by machine screws to a sensing pin guide plate 26 presently to be described more fully. A front plate 27 is secured by machine screws to the guide plate 26 but is spaced therefrom by spacing members 28 and 29. The latter have a thickness slightly greater than the thickness of the badge 10 of FIG. 1, and are spaced apart by the width of the badge thus to provide between the plates 26 and 27 and the spacing members 28 and 29 a rectangular orifice 30 in which the badge is to be manually inserted and manually depressed into reading position against the spring bias force of a cycle-patrol latch bail presently to be described. The front plate 27 is provided with spaced grooves 31 to receive the ends of any sensing pins which project through information code apertures of the badge during reading of the information from the later. The top opposing corners of the plates 26 and 27 are centrally bevelled, as shown at 32 and 33, to enable the top edge of the badge to be more readily grasped in removing it from the reader.

Figure 4:
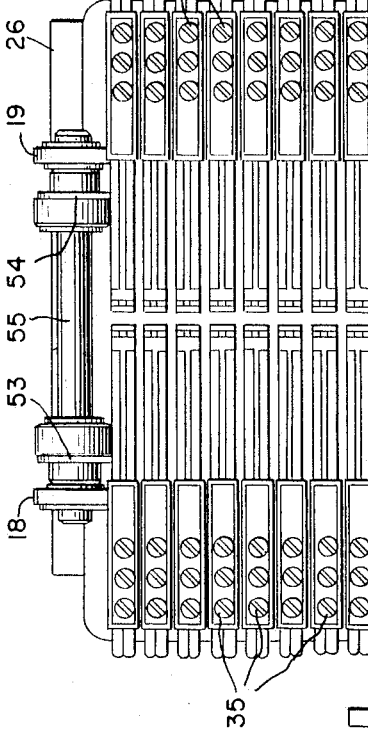

The rear edges of the side plates 18 and 19 are turned out to provide supporting flanges 34 to which are bolted plural stacks of pairs of reader electrical contacts 35 having five contact pairs per stack as illustrated in FIG. 3 and having five vertically positioned stacks on each side of the reader as illustrated in FIG. 4. As thus arranged, there is one contact pair 35 for each available index point included in the ten columns of ten rows of index points which may be punched in the area 12 of the badge to record coded information. Secured by machine screws between the side plates 18 and 19 and near their rear edge is a vertical guide plate 36 described more fully hereinafter. This plate has an array of apertures of rectangular cross section formed in a manner presently to be explained and effective to guide an array of reciprocal actuators 37 individual to each of the electrical contacts 35 and operative to actuate the contacts between open-circuit and closed-circuit positions.

As indicated more clearly in FIGS. 2, 3 and 5, the guide plate 26 has narrow vertical slots 38 milled into its rear face and has horizontal slots 39 of greater width milled into its front face and of sufficient depth as to intersect the slots 38. These vertical and horizontal milled slots produce rectangular apertures in the guide plate 26 with the apertures elongated in the vertical direction and positioned in an aperture array corresponding to the array of index points available for code apertures in the badge 10. The guide plate 36 likewise has vertical slots 40 milled in its front face and horizontal intersecting slots milled into its rear face likewise to provide an array of rectangular apertures corresponding to the array of apertures in the guide plate 26 and adapted to guide the contact actuators 37. There is indicated in FIG. 3, and more fully described hereinafter, an array of sensing pins 41 which are supported for reciprocal motion in the apertures of the guide plate 26 and have forward ends 42 of reduced rectangular cross-section arranged to project through corresponding code apertures sensed in reading the coded information from a badge placed in reading position in the slot 30 of the reader. The sensing pins 41 extend through rectangular apertures provided in an actuating plate 42 by reason of vertical rear face grooves 43 and intersecting horizontal front face grooves of depth indicated by the broken line 44 in FIG. 3.

As will be illustrated and explained more fully hereinafter, the sensing pins 41 have a T-shaped rear head which is biased into engagement with the bottoms of the grooves 43 of the actuating plate 42 by a spring bias force exerted through an articulated latch member 45 individual to each sensing pin. The actuating plate 42 is mounted for driven reciprocatory motion and moves forwardly to permit the sensing pins 41 similarly to move forwardly and sense code apertures in the badge, the forward motion of the sensing pins 41 being effected by the spring bias force exerted upon the sensing pins by their associated articulated latch members 45. Those sensing pins 41 which find and project through a code aperture in the badge permit the associated latch members 45 to move into latching engagement with the contact actuators 37. Upon power driven return motion of the actuating plate 42, the T-shaped rear head of those sensing pins which have sensed a code aperture are engaged and forceably driven rearwardly by the actuating plate. This causes these sensing pins to drive their associated latch members 45 and associated latched actuators 37 rearwardly to close corresponding ones of the reader contacts 35. At the outset of the next card reader cycle, an unlatch plate 48 is reciprocated vertically to interrupt the latched engagement of any latch member 45 and its associated actuator 37.

The manner in which the actuating plate 42 is supported for power driven reciprocatory motion is shown more clearly in FIGS. 3, 5, 6 and 7. Side plates 49 and 50 are secured by machine screw along each edge of the actuating plate 42 and are pivotally connected respectively at 51 and 52 (FIG. 6) to respective dependent arms 53 and 54 pivotally supported upon a shaft 55 journalled by bearings in the side plates 18 and 19. The side plates 49 and 50 are also respectively pivoted at 56 and 57 on respective bell cranks 58 and 59 supported for pivotal motion on a shaft 60 journalled in bearings in the side plates 18 and 19. A link 61 connects the upper end of bell crank 58 and the lower end of the arm 53, and a similar link 62 connects the upper end of the bell crank 59 and the lower end of the arm 54. The lower ends of the bell cranks 58 and 59 are connected by a bridging spacer member 63 for angular movement in unison, and it will be evident that angular reciprocatory motion of the bell cranks 58 and 59 causes a linear reciprocatory motion of the actuating plate 42. In each card reading cycle, the actuating plate 42 is reciprocated from a rearmost position to a forward position and is returned to its rearmost position under control of a pair of cams 66 and 67 (FIG. 4) of like cam contour. These cams engage cam follower rollers 68 pivotally mounted on the lower ends of the bell cranks 58 and 59, the rollers 68 being biased into engagement with their associated cams 66 and 67 by a spring 69 which extends between the spacer member 63 and a shaft 70 pivotally supported in the side frames 18 and 19.

As shown more clearly in FIG. 4, the cams 66 and 67 are secured upon a shaft 72 having one end journalled by a bearing 73 in the side plate 23 of the sub-assembly 17 and having its other end journalled in and through a 360° helical wire spring clutch 75 journalled by a bearing 76 in the side plate 22 of the subassembly 17. The clutch 75 has the general construction and mode of operation shown and described in U.S. Pat. No. 2,927,158 and upon brief energization of its electromagnet 77 effects mechanical driving connection between a pulley 74, belted to a driving motor (not shown), and the shaft 72 for one complete revolution of the latter. Each revolution of the shaft 72 constitutes a card reading cycle of the reader. During this cycle, the cams 66 and 67 are driven through one complete revolution and reciprocate the bell cranks 58 and 59 through a small angular arc to effect linear reciprocation of the sensing pin actuating plate 42. This motion of the actuating plate causes the sensing pins to sense the coded information punch-recorded in the badge and, through the latch member 45 and contact actuators 37, effectively to cause the storage of this information at the end of the card cycle in the electrical contacts 35.

The coded information thus stored in the electrical contacts 35 during one card reading cycle is destroyed at the outset of the next card reading cycle by brief vertical reciprocation of the unlatch plate 48 to effect mechanical unlatching of the latch members 45 and contact actuators 37. To this end, and as indicated more clearly in FIG. 2, the latch plate 48 normally is spring biased downwardly to an inactive position by a spring 78 connected between the latch plate 48 and a bracket 79 secured to one flanged foot 20 of the subassembly 16. As shown in FIGS. 6 and 7, the latch plate 48 is provided near its lower end with short upstanding flanges 80 each having an integral stud 81. These are engaged by slotted ends of a forked bell crank 82 pivotally supported on the shaft 70 and having at its remote end a pivotally supported cam follower roller 83 biased by the spring 78 into engagement with a cam 84 (FIG. 4) secured upon the shaft 72. As the cam 84 rotates during a card-reading cycle, the cam contour is selected such that at the outset of the cycle the bell crank 82 is briefly reciprocated first clockwise and then counter-clockwise as seen in FIG. 7 through a small angle briefly to raise the unlatch plate 48 to its unlatch position and then immediately return it to its normal inactive position.

When the present punched-card reader comprises one coded-information data translating unit of a more complete system, it is often desirable to provide an electrical indication that the reader has initiated a cycle of reading operation and to indicate its progress through this cycle. To this end, and as indicated more clearly in FIG. 8, there is fixedly supported upon the power driven shaft 72 a cam 87 which cooperates with a cam follower contact sub-assembly 88. The latter includes a cam follower 89 pivotally supported upon a sub-assembly base member 90 generally of rectangular cross-section bar configuration. The cam follower 89 is biased into engagement with the cam 87 by a leaf type of spring member 91, the remote end of which also engages the end of an actuator pin 92 slidably extending through an aperture of the base member 90 to effect reciprocal actuation of an electrical contact assembly 93 supported upon the base member 90. One end 94 of the base member 90 is of enlarged rectangular cross-section and is received within a groove 95 of a support bar 96 secured by machine screws to the side wall 23 of the sub-assembly 17 as shown in FIG. 4. The enlarged end 94 of the support member 90 terminates in an extension 97 of square cross-section which is slidably received within a rectangular bore 98 of the bar 96. A set screw 99 with lock nut 100 provides a convenient adjustment of the positioning of the sub-assembly 88 with respect to the cam 87, and the sub-assembly is secured in adjusted positon to the support bar 96 by a machine screw 101 which projects through an elliptical bore 102 of the support bar 96. It will be evident that rotation of the cam 87 during each card reading cycle effects closure of the electrical contacts of the contact assembly 93 for a preselected angular rotation of the power driven shaft 72 according to the contour selected for the cam 87.

Each cycle of badge reading operation of the reader is initiated, or in a larger multi-unit data translation system the reader is conditioned to initiate a cycle of operation, by manual insertion of a badge into the badge-receiving aperture 30 followed by manual pressure of the badge into reading position against the spring-bias opposing force of a cycle-control latch member shown in FIGS. 5–7 and 9–12. This latch member is comprised by a bail having a flat bail portion 105 (FIG. 10) pivotally supported upon the shaft 60 by arms 106 and 107 of which the arm 107 constitutes an arm of bell crank having a further arm 108 provided with forked end portions 109 and 110. The bail portion 105 is positioned, as shown in FIGS. 7 and 9, directly below the badge receiving aperture 30 to be engaged and moved by the lower edge of a badge inserted in the aperture. The bail portion 105 is biased into normal engagement with the lower edge surface 111 of the guide plate 26, and the lower edge surface 112 of an undercut rear edge portion of the front plate 27, by a helical spring 113 extending between a stud 114 on the foot 20 of the side plate 19 and a stud 115 (FIG. 10) provided on the forked end 110 of the bell crank arm 108. The arm 108 pivotally supports, by means of a rivet 116, an articulated arm 117 and bent along its length to have its end portion 109 cross over the end of the arm 117. The latter is biased into engagement with the arm end portion 109 by a helical spring 118 (FIG. 9) extending between a stud 119 on the end portion 109 and a turned over short flange 120 on the arm 117.

Manual pressure exerted longitudinally on a badge in the badge-receiving aperture 30 causes the badge to rotate the cycle-control latch structure just described against the bias of its spring 113. The badge is fully inserted into reading position when the bail portion 105 of the latch structure engages a stop bar 121 secured by machine screws on the rear face of the undercut edge portion of the front plate 27 as shown. At this time an electrical contact assembly 122 (FIGS. 5 and 10), secured to the flange foot 20 of the side plate 18, is operated through a link 123 coupled to a stud 124 provided on the arm 106 of the latch structure. Operation of the contact assembly 122 to close one pair of its contacts and effect transfer of others of its contacts signifies, as a first reader cycle initiating condition, that a badge has been inserted fully into the reader. If the badge has been properly inserted so that its index point area 12 is positioned in front of the reader sensing pins, the aperture 11 in the badge will be aligned with aligned apertures 125 and 126 provided respectively in the guide plate 26 and front plate 27 and thus will be positioned to receive a badge lock-in plunger 127 actuated in a manner now to be described.

The articulated arm 117 of the cycle-control latch structure includes a projecting leg portion 130 having its end turned out to provide a latch element 131 positioned normally to engage a cooperating L-shaped latch element 132 riveted on the side of an arm 133 of a bell crank pivotally supported on the shaft 70 (FIGS. 7, 9 and 11). This bell crank has a further arm 134 to which an arm extension 135 is adjustable secured by machine screws 136. The arm 134 and its extension 135 are normally biased by a helical spring 137 to engage a cam-follower roller 138, rotatably supported on the lower end of the arm extension 135, with a cam 139 secured upon the driven shaft 72 (FIG. 4). Engagement of the roller 138 and cam 139 is normally prevented, however, by the latched engagement of the latch elements 131 and 132 as normally occurs at the end of each reader cycle. When a badge is inserted into reading position and effects rotation of the latch structure as last described, the arm extension 117 is rotated by its engagement with the end 109 of the arm 108 and moves the latch element 131 out of engagement with the latch element 132. This permits the spring 137 to move the crank arm 133 counter-clockwise as seen in FIGS. 7 and 9, whereby the latch element 132 moves beneath the latch element 131 as shown in the fragmentary view of FIG. 12. The cam-follower roller 138 thereby moves toward engagement with the cam 139, but for reasons presently to be explained does not actually engage the cam unless the lock-in plunger 129 enters the aperture 11 of the badge.

At this time the crank arm 133 through a link 140 rotates a U-shaped bail 141 (FIGS. 9 and 10) counter-clockwise about the shaft 60 upon which the bail is rotatably supported. An extension 142 on the bail 141 engages a slot 143 milled into one side of the lock-in plunger 127, and the rotation of the bail 141 projects the plunger forwardly through the aperture 11 of the badge 10 if the badge is properly positioned so that the aperture 11 is aligned with the plunger. The plunger 127 upon entering the aperture 11 of the badge locks the latter in reading position until the end of the ensuing reader cycle of operation, and this lock-in position of the plunger permits the bail 141 to rotate sufficiently that the cam-follower roller 13 is moved into engagement with the cam 139. As more clearly shown in FIG. 10, the outer arm of the bail 141 carries a stud 144 which is connected through a link 145 to actuate an electrical contact assembly 146. The contacts of this assembly move to closed-contact position if the bail 141 is permitted to rotate to full extent by movement of the plunger 127 to its lock-in position where it projects through the aperture 11 of the badge. Closure of the contacts of the contact assembly 146 signifies, as a second reader cycle initiating condition, that the badge has been locked in reading position. In particular, electrical energization of the reader clutch 75 to initiate a cycle of reader operation is accomplished through a series electrical circuit which includes normally open contacts of both the badge-in contact assembly 122 and the lock-in contact assembly 146. Thus, both of these contact assemblies must be concurrently operated to closed-contact states before the clutch 75 can be energized.

If the badge should be inadvertently inserted into the reader upside-down or backwards whereby its aperture 11 is not properly aligned with the lock-in plunger 127, the latter is unable to move to lock-in position but rather is halted in its movement by engagement with the rear surface of the badge. This limited movement of the plunger does not permit the bail 141 to rotate sufficiently far as to effect closure of the contacts of the contact assembly 146. The open-contact state of the latter for reasons just explained prevents initiation of a reader cycle of operation. This is desirable since otherwise a false reading would occur. The plunger-limited rotation of the bail 141 also prevents engagement of the cam-follower roller 138 with the cam 139, so that the bias force of the spring 137 continues to be exerted toward movement of the plunger 127 to lock-in position. Now when the badge 10 is manually removed from the reader, the plunger 127 is no longer restrained by the badge from completing its forward movement and accordingly moves to lock-in position. This causes additional rotation of the bail 141 and closure of the contacts of the contact assembly 146. However, the previous removal of the badge from the reader permitted return of the latch bail 105 to its normal position of rest in engagement with the lower edge surfaces 111 and 112 of the respective guide plate 26 and front plate 27, the articulated arm 117 permitting this restoration of the latch bail 105 notwithstanding the now-overlapping engagement of the latch elements 131 and 132 as shown in FIG. 12. The restored position of the bail 105 opens the contacts of the contact assembly 122 which prevents initiation of a cycle of reader operation even though the contacts of the assembly 146 are now closed. This is for the reason, previously explained, that electrical energization of the reader clutch can be effected only when both of the electrical contact assemblies 122 and 146 are concurrently operated to closed-contact states.

When the lock-in plunger 127 moves to lock-in position under the conditions last described, it blocks subsequent insertion of a badge into reading position in the reader. This fact insures that no further reader cycle of operation can be initiated until the cycle control latch structure has been properly reset. Such reset is accomplished by a manual reset button assembly having the construction illustrated in FIG. 13. The reset button 149 of this assembly is reciprocally supported within a bore 150 of a casing 151 having a nose 152 threaded into an enlarged threaded bore 153 forwardly of and concentric with the aperture 126 of the front plate 27. The button 149 is secured to a plunger 154 which is slidably received in a concentric aperture 155 of the casing 151 and thus is positioned in coaxial relation with the lock-in plunger 127. An internal helical spring 156, positioned between the bottom of the housing bore 150 and the bottom of an annular groove 157 of the button 149, normally biases the button to inactive position limited by a collar 158 seated on the plunger 154. Manual pressure on the button 149 engages the plunger 154 with the end of the lock-in plunger 127 and moves it rearwardly. The plunger 127 thereupon rotates the bail 141 clockwise as seen in FIGS. 7 and 9, and the latter through the connecting link 140 similarly rotates the bell crank arm 133 clockwise until the latch element 132 of the arm 133 moves out from under the latch element 131 of the articulated arm 117 as illustrated in FIG. 14. This permits the latch element 131 to restore, under bias of the spring 118, to normal latching position where it engages the latch element 132 upon release of manual pressure from the push button 149.

The manual latch reset operation last described also occurs by automatic operation, rather than manually, near the end of each reader cycle. It is accomplished by a lobe (not shown) on the cam 139 which, by engagement with the cam-follower roller 138, rotates the bell crank arm 134, 135 clockwise as seen in FIGS. 7 and 9. This effects a corresponding clockwise rotation of the bell crank arm 133 and bail 141 to effect latch reset as just described and to withdraw the lock-in plunger 127 from the aperture 11 of the badge. The badge upon being thus released is moved upwardly in the badge receiving aperture 30 by action of the spring 113 exerted through the cycled-control latch bail 105. The badge may then be manually grasped and removed from the reader. The reset lobe of the cam 139 passes beyond the cam-follower roller 138 to complete the reset operation and leave the cam-follower roller 138 positioned in placed relation to the surface of the cam 139.

To prevent more than one reader cycle of operation should a badge be manually held depressed in reading position, the reader is provided with an anti-repeat latch element. This element comprises an arm 161 pivotally supported on the shaft 60 and having a short over-turned latch element 162 in opposing relation to the latch element 131, as illustrated in FIGS. 7, 9 and 15. The latch element 162 is of sufficient length as to have its end positioned beneath the latch element 132 of the crank arm 133 when the latch elements 131 and 132 are in latched engagement. A helical spring 163 is connected between the ends of arms 117 and 161 as shown to bias the latch element 162 toward engagement with the latch element 131. If at the time of the automatic latch reset operation last described a badge is manually held depressed in reading position, the cycle control bail 105 will be maintained in depressed position by continuing engagement with the end of the card. This will maintain the crank arm 108 and its articulated arm 117 fully rotated to a counter-clockwise position where the latch element 131 of the arm 117 is out of alignment with the latch element 132 of the crank arm 133. Hence upon rotation of the latter clockwise by engagement of the reset lobe of the cam 139 with the cam-follower roller 138, the spring 163 moves the latch element 162 into engagement with the latch 131 so that the latch element 132 now engages the latch element 162 (as illustrated by the fragmentary view of FIG. 16) upon continued movement of the cam reset lobe out of engagement with the cam-follower roller 138. This maintains the bell crank arm 133 and bail 141 rotated to a clockwise position, as seen in FIGS. 7 and 9, sufficient to maintain the plunger-in contact assembly 146 in open-contact state and thereby present electrical energization of the reader clutch 75 to initiate a further cycle of reader operation. Since the lock-in plunger has now been disengaged from the aperture 11 of the badge, release of manual pressure on the badge permits the spring 113 to rotate the cycle-control bail 105 clockwise and raise the badge out of reading position. The crank arm 108 also rotates clockwise with the bail 105, and the spring 118 causes the articulated arm 117 likewise to rotate clockwise. The latch element 131 thereupon pushes the latch element 162 and arm 161 clockwise until the latch element 162 is no longer aligned with the latch element 132, whereupon the latter moves into latched engagement with the latch element 131. The latch structure is now conditioned to initiate a further cycle of reader operation upon manual insertion of a badge into reading position in the reader.

Figure 17:
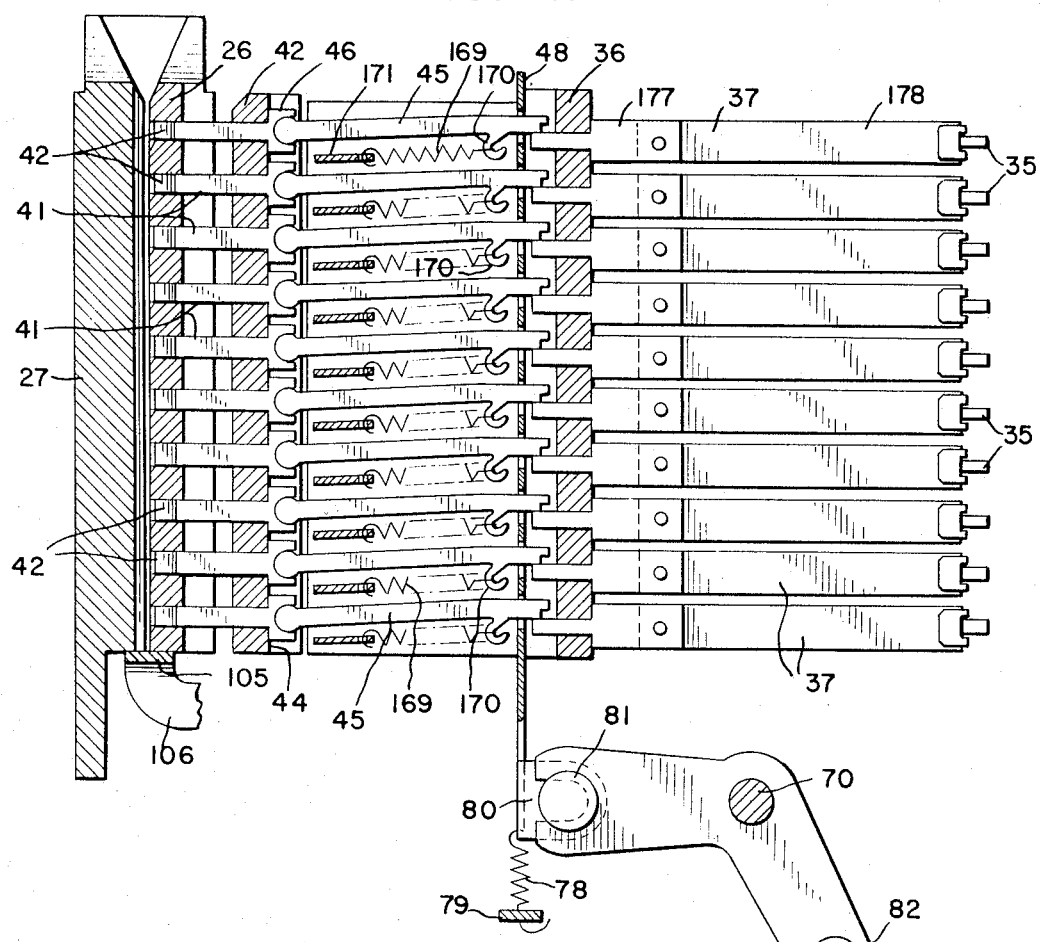
Figure 18:
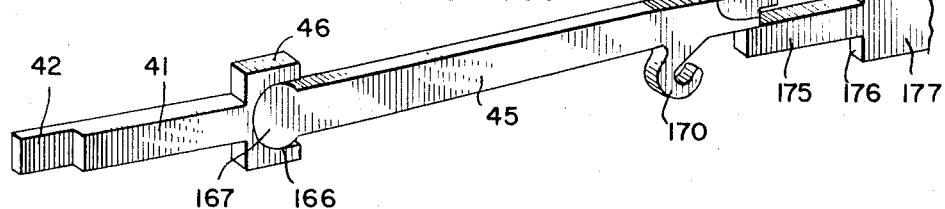
Figure 19:
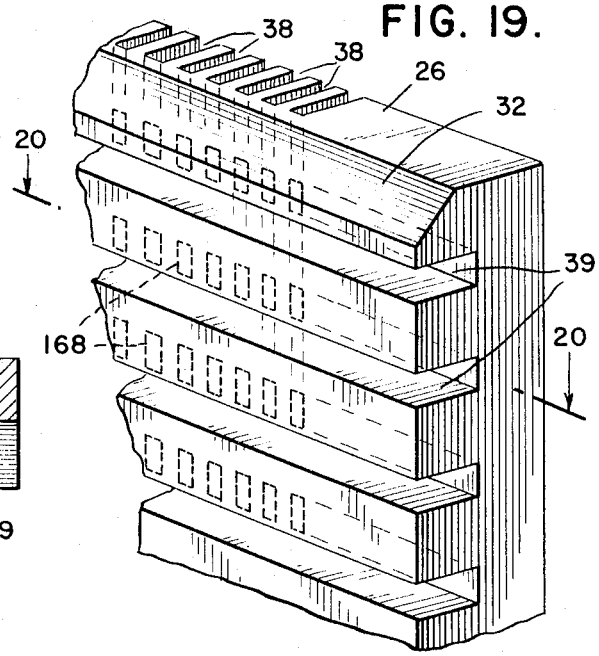
Figure 20:
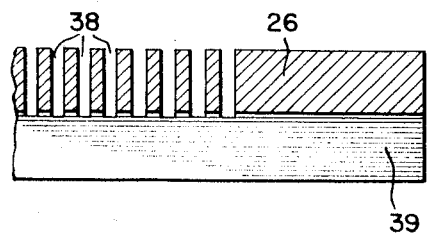

FIGURE 17 is an enlarged cross-sectional view in elevation of the reader sub-assembly 16 illustrating more clearly the arrangement of the sensing pins 41, their associated articulated latch members 45, and the contact actuating members 37. FIGURE 18 shows the configuration of the sensing pins 41 and latch members 45, and it will be seen that the sensing pins 41 are of rectangular cross-section having an enlarged head 46 also of rectangular cross-section. The forward end of the sensing pins have a reduced cross-sectional end portion 42 adapted to enter the rectangular code apertures of the badge. The sensing pin head 45 is provided at the rear with a centrally positioned socket 166 of hemicylindrical cross-section which receives a rounded enlarged head 167 integrally formed on the front end of the latch member 45 to provide a swivel joint between each sensing pin and its latch member.

It was previously explained that the sensing pins extend through rectangular apertures formed by intersecting vertical and horizontal grooves milled in the respective rear and front sides of the guide plate 26 and actuating plate 42. This construction is illustrated in the fragmentary enlarged perspective view of FIG. 19 and the fragmentary enlarged cross sectional view of FIG. 20 for the guide plate 26, from which it will be apparent how the guide apertures 168 of rectangular cross section are formed. The same construction is used in fabricating the actuating plate 42 and the guide plate 36. The vertical grooves of the actuating plate 42 are only slightly wider than the thickness of the sensing pins 41 and latch members 45, and accordingly restrain the heads 167 of the latch members 45 against lateral movement out of the sensing pin sockets 166. The heads 167 of the latch members 45 are maintained seated in the sensing pin sockets 166, and the enlarged heads 46 of the sensing pins are maintained in engagement with the bottom surface of the vertical grooves of the actuating plate 42, by helical springs 169 (FIG. 17). These extend between integral hooks 170 formed as shown on the latch members 45 and a plate 171 common to horizontal rows of latch members 45 and extending between side plates 172 (FIG. 3) having flanged feet 173 secured by machine screws to the front surface of the guide plate 36.

The rear end of each latch member 45 is provided with a notch 74 (FIG. 18) adapted latchably to engage the reduced cross-section front-guide end portion 175 of an associated actuating member 37. The shoulders 176 of the actuating members 37 are normally biased into engagement with the rear surface of the guide plate 36 by a leaf-spring type of resilient force provided by the movable contact of the contact pair 35 to which the actuator member is mechanically coupled. Since the contacts 35 are included in reader electrical circuits, the contact actuating members 37 are fabricated as shown in FIG. 17 by a metal bar guide portion 177 suitably riveted to an insulated bar contact actuator portion 178.

Figure 21:
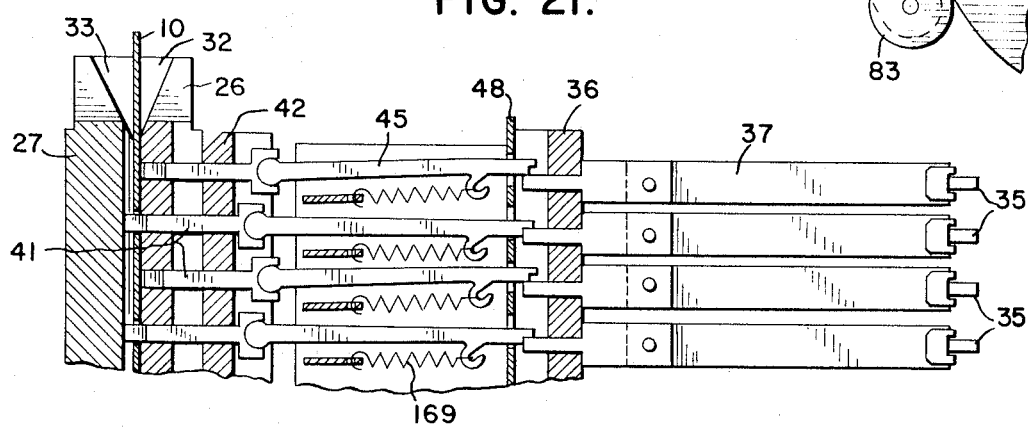
Figure 22:
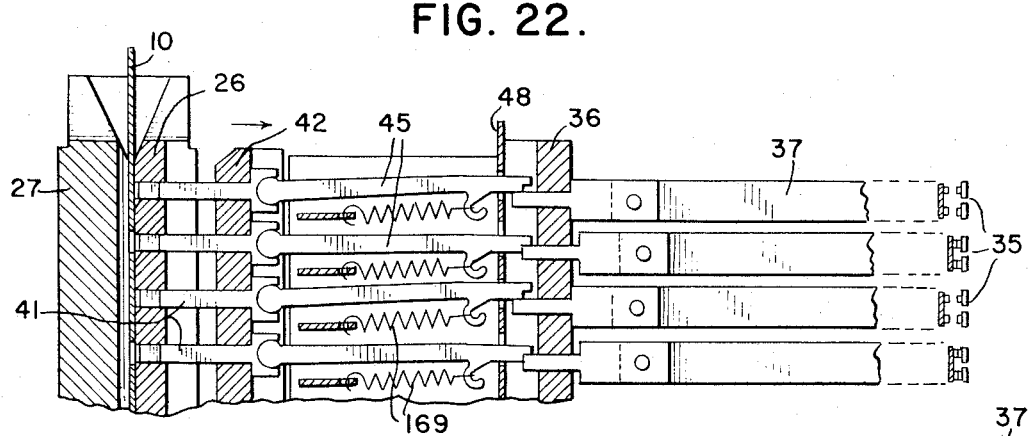

It was previously explained that the cam 84 and cam-follower bell crank 82 operate at the outset of each new reading cycle briefly to reciprocate the unlatch plate 48 vertically for the purpose of unlatching any of the latch members 45 and contact actuators 37 which may have remained in latched engagement at the end of the previous reading cycle. As the new reading cycle progresses, the actuating plate 42 moves forward and is followed by the sensing pins 41 moved by spring bias force exerted thereon from the springs 169 through the latch members 45. At the most forward position of the actuating plate 42, illustrated by the fragmentary view of FIG. 21, those sensing pins 41 which find no corresponding code aperture in the badge 10 engage the back surface of the badge and thus halt their forward motion at a position which does not permit their associated latch member to engage its notch 174 with the end of the associated contact actuator 37. When a sensing pin 41 finds a corresponding code aperture in the badge, however, the reduced end portion 42 of the sensing pin passes through the aperture as in the case of the second and fourth sensing pins illustrated in FIG. 21. In this event, the greater forward movement of the sensing pin enables its associated latch member 37 to engage the notch 174 of the latch member over the end of the associated contact actuator 37 as illustrated in FIG. 21. Now when in completing the reading cycle the actuating plate 42 returns by cam and cam-follower power drive in the manner earlier explained, its engagement with the enlarged head 46 of those sensing pins 41 which have sensed a corresponding code aperture effects drive of these sensing pins with their associated latch members 45 and associated latched contact actuators 37 to an actuated position illustrated in FIG. 22 where the associated electrical contacts 35 have been moved to closed-contact positions. Thus the number of code apertures 13 and their individual index-point positions in the index-point array of the area 12 of each badge read is effectively duplicated at the end of a reading cycle of operation by the closed-contact states of the same corresponding number and order of positioning of the electrical contacts 35 in the contact array. These actuated and non-actuated positions of the contact actuators 37, and the corresponding closed-contact and open-contact states of their associated contacts 35, effect mechanical storage of the coded information read from each badge at the completion of the badge reading cycle. It will be evident that such information storage continues without change or possibility of change until the outset of the next reading cycle no matter how remote in point of time such later reading cycle may occur.

It will be evident from the foregoing description of the invention that a coded-information punched-card reader embodying the invention accomplishes rapid and accurate reading and cyclic storage of all coded-information punch recorded in a card, and does this by a reader structure having exceptionally high operational stability over prolonged periods of operation. It will further be evident that the reader structure is of sturdy, compact, and relatively simple and inexpensive construction having built-in operational safeguards permitting its reliable use by persons possessing little skill or training. The effective electrical storage, by the actuated states of the reader electrical contacts, of information read at high rapidity from a punched card enables more leisurely translation and use of the information either locally or by remotely situated utilizing devices coupled to the reader electrically by means of any of various forms of data translating systems.

As will be apparent to those skilled in the art in the light of the foregoing disclosure, many modifications, alterations and substitutions are possible in the practice of this invention without departing from the spirit or scope thereof.

I claim:
1. A coded-information punched-card reader comprising an array of aperture sensing pins arranged to sense individual ones of a corresponding array of index-point code apertures of a punched card, means for biasing said sensing pins toward sensing position thereof, power driven means for permitting biased movement of said sensing pins from non-sensing to sensing position and for returning said pins by bias-opposing power drive to said non-sensing position, an array of code-storage elements corresponding to said array of sensing pins and means for biasing said storage elements to non-storage positions, a latch element interposed between each of said sensing pins and storage elements and reciprocally movable with said each sensing pin between said non-sensing and sensing positions thereof to effect latched-engagement driven movement from non-storage to code-storage position of individual ones of said storage elements against the bias force of the biasing means thereof and by power driven return movement of individual ones of any of said sensing pins which sense a corresponding aperture in said card, thereby to store by the positioning of said elements the coded information sensed in each card read, and means for moving all of said latch elements to unlatch position prior to completion of said movement of said sensing pins from non-sensing to sensing position.

2. A coded-information punched-card reader comprising an array of aperture sensing pins arranged to sense individual ones of a corresponding array of index-point code apertures of a punched card, means for biasing said sensing pins toward sensing position thereof, cyclically operated power driven means for effecting during each card reading cycle movement of said sensing pins from non-sensing to sensing position and for returning said pins by biasing-opposing power drive to said non-sensing position, an array of code-storage elements corresponding to said array of sensing pins and means for biasing said storage elements to non-storage positions thereof, said storage elements being adapted to be individually engaged and drivingly moved from non-storage to code-storage position by power driven return movement of individual ones of any of said sensing pins which sense a corresponding aperture in said card, thereby to store by the positioning of said elements at the end of each reading cycle the coded information sensed in each card read, and cyclically operated means for restoring all of said storage elements to non-storage position at the outset of each card reading cycle.

3. A coded-information punched-card reader comprising an array of aperture sensing pins and articulated latches arranged and spring biased to reciprocate in unison between non-sensing and code-aperture sensing positions to effect spring-biased sensing by said pins of individual ones of a corresponding array of index-point code apertures of a punch card, power driven means for permitting biased movement of said sensing pins from non-sensing to sensing position and for returning said pins by bias-opposing power drive to said non-sensing position, an array of code-storage elements corresponding to said array of sensing pins and having individual actuators adapted to be individually aligned with and latchably engaged by an individual one of said latches and drivingly moved thereby from non-storage to code-storage position by power driven return movement of individual ones of any of said sensing pins which sense a corresponding aperture in said card, thereby to store by the positioning of said elements the coded information sensed in each card read, and means for moving all of said latches to unlatch position out of alignment with said actuator prior to completion of said movement of said sensing pins from non-sensing to sensing position.

4. A coded-information punched-card reader comprising an array of aperture sensing pins arranged to sense individual ones of a corresponding array of index-point code apertures of a punched card, power driven means for effecting movement of said sensing pins from non-sensing position to sensing position and for returning said pins by power drive to said non-sensing position, an array of electrical contacts corresponding to said array of sensing pins, contact actuators adapted to be individually engaged by said sensing pins for driven movement of individual ones of said contacts from contact-open to contact-closed position by power driven return movement of individual ones of any of said sensing pins which sense a corresponding aperture in said card, thereby to store by the contact positioning of said contacts the coded information sensed in each card read, and means for permitting all of said contacts to return to open-circuit position prior to initiation of said return movement of said sensing pins.

5. A coded-information punched-card reader comprising an array of aperture sensing pins and articulated latches arranged for reciprocal motion to effect spring-biased sensing by said sensing pins of individual ones of a corresponding array of index-point code apertures of a punched card, power driven means for permitting biased movement of said sensing pins from non-sensing to sensing position and for returning said pins by bias-opposing power drive to said non-sensing position, an array of electrical contacts having individual contact actuators corresponding in number to said array of sensing pins and with said actuators supported for reciprocal motion and adapted to be individually latched by an individual one of said latches to effect driven movement of individual ones of said contacts from contact-open to contact-closed position by power driven return movement of individual ones of any of said sensing pins which sense a corresponding aperture in said card, thereby to store by the contact positioning of said contacts the coded information sensed in each card read, and means for moving all of said latches to unlatch position prior to completion of said movement of said sensing pins from non-sensing to sensing position.

6. A coded-information punched-card reader comprising an array of aperture sensing pins and articulated latches arranged and spring-biased to reciprocate in unison between non-sensing and code-aperture sensing positions to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of code-storage elements corresponding to said array of sensing pins and having individual actuators adapted to be individually aligned with and latchably engaged by an individual one of said latches and drivingly moved thereby from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for moving all of said latches to unlatched position out of alignment with said actuators to return all of said storage elements to non-storage position, and means responsive to the positioning of a card in readiness to be read by said sensing pins for enabling said power driven means to initiate a cycle of operation.

7. A coded-information punched-card reader comprising an array of aperture sensing pins and articulated latches arranged and spring-biased to reciprocate in unison between non-sensing and code-aperture sensing positions to sense individual ones of a corresponding array of index-point code apertures of a punched card, power driven means having a cyclic operation for effecting during each cycle thereof movement of said sensing pins from non-sensing to sensing position and for returning said pins by biasing-opposing power drive to said non-sensing position, an array of code-storage elements corresponding to said array of sensing pins and having individual actuators adapted to be individually aligned with and latchably engaged by an individual one of said latches and drivingly moved thereby from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for moving all of said latches to unlatched position out of alignment with said actuator to return all of said storage elements to non-storage position, and cycle-control latch means operated by the positioning of a card in readiness to be read by said sensing pins for initially enabling said power driven means to initiate a cycle of operation and for thereafter latchably disabling said power drive means against initiating a further cycle of operation while said card remains in said readiness position.

8. A coded-information punched-card reader comprising an array of aperture sensing pins and articulated latches arranged and spring biased to reciprocate in unison between non-sensing and code-aperture sensing positions to sense individual ones of a corresponding array of index-point code apertures of a punched card, power driven means having a cyclic operation for effecting during each cycle thereof movement of said sensing pins from non-sensing to sensing position and for returning said pins by bias-opposing power drive to said non-sensing position, an array of code-storage elements corresponding to said array of sensing pins and having individual actuators adapted to be individually aligned with and latchably engaged by an individual one of said latches and drivingly moved thereby from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for moving all of said latches to unlatched position out of alignment with said actuators to return all of said storage elements to non-storage position, and cycle-control latch means operated by the positioning of a card in readiness to be read by said sensing pins for enabling said power driven means to initiate a cycle of operation and for preventing movement of said card out of reading position until completion of the cycle of operation thus initiated.

9. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, and cycle-control latch means operated by the positioning of a card in readiness to be read by said sensing pins for enabling said power driven means to initiate a cycle of operation and for locking said card in reading position until completion of the cycle of operation thus initiated.

10. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, cycle-control latch means operated by the positioning of a card in readiness to be read by said sensing pins for partially enabling said power driven means to initiate a cycle of operation and for locking said card in reading position until completion of the cycle of operation thus initiated, and means responsive to the completion of locking of said card in said position by said last-mentioned means for fully enabling said power driven means to initiate a cycle of operation.

11. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, cycle-control latch means responsive to the manual insertion of a card into position in readiness to be read by said sensing pins for enabling said power driven means to initiate a cycle of operation, and means responsive to manual retention of said card in said reading position for preventing a succeeding cycle of operation of said power driven means.

12. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, cycle-control latch means responsive to the manual insertion of a card into position in readiness to be read by said sensing pins for enabling said power driven means to initiate a cycle of operation and upon completion of said operating cycle to move said card away from said reading position, and anti-repeat latch means responsive to manual retention of said card in said reading position for preventing a suceeding cycle of operation of said power driven means until said card is permitted to be moved away from said reading position.

13. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing positions and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, first cycle-control means responsive to the positioning of a card in readiness to be read by said sensing pins for establishing a first of two control conditions which together enable said power driven means to initiate a cycle of operation, and second cycle-control means controlled by said first cycle-control means for locking said card in said reading position and for establishing the second of said conditions enabling said power driven means to initiate a cycle of operation.

14. A coded-information punched-card reader comprising an array of aperture sensing pins arranged to sense individual ones of a corresponding array of index-point code apertures of a punched card, power driven means having a cyclic operation for effecting during each cycle thereof movement of said sensing pins from non-sensing to sensing position and for returning said pins by power drive to said non-sensing position, an array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power driven means for returning all of said storage elements to non-storage position, cycle-control latch means responsive to the manual insertion of a card into position in readiness to be read by said sensing pins for establishing a first of two conditions which together enable said power driven means to initiate a cycle of operation and upon completion of said cycle to move said card away from said reading position, second cycle-control means controlled by said first cycle-control means for locking said card in said reading position and for establishing the second of said conditions enabling said power driven means to initiate a cycle of operation, and anti-repeat latch means responsive to manual retention of said card in said reading position for preventing a suceeding cycle of operation of said power driven means until said card is permitted to move away from said reading position.

15. A coded-information punched-card reader comprising an array of aperture sensing pins arranged to sense individual ones of a corresponding array of index-point code apertures of a punched card, a power-driven cam having a cyclic operation, a cam follower engageable with said cam and mechanically coupled to a sensing pin actuating member to effect during each cam cycle movement of said sensing pins from non-sensing to sensing position and for returning said pins by power drive to said non-sensing position, an array of code-storage elements corresponding to said array of sensing pins and adapted to be individually engaged and drivingly moved from non-storage to code-storage position by power driven return movement of individual ones of any of said sensing pins which sense a corresponding aperture in said card, thereby to store by the positioning of said elements the coded information sensed in each card read, means operative at the outset of each cycle of said power-driven cam for returning all of said storage elements to non-storage position, and cycle-control latch means operated by the positioning of a card in readiness to be read by said sensing pins for unlatching said cam follower into engagement with said cam to initiate a cycle of reader operation and for relatching said cam follower out of engagement with said cam at the end of said cycle of reader operation.

16. A coded-information punched-card reader comprising an array of aperture sensing pins arranged to sense individual ones of a corresponding array of index-point code apertures of a punched card and individually spring biased toward aperture sensing position, a power-driven cam having a cyclic operation, a cam follower engageable with said cam and mechanically coupled to reciprocate a sensing-pin actuating plate to permit during each cycle of said cam spring-biased movement of said sensing pins from non-sensing to sensing position and for returning said pins by actuating-plate drive to said non-sensing position, an array of code-storage latchable elements corresponding to said array of sensing pins and adapted to be individually latchably engaged and drivingly moved from non-storage to code-storage position by power driven return movement of individual ones of any of said sensing pins which sense a corresponding aperture in said card, thereby to store by the positioning of said elements the coded information sensed in each card read, cam-operated means operative at the outset of each cycle of said power-driven cam for unlatching all of said storage elements to non-storage position, and cycle-control latch means operated by the positioning of a card in readiness to be read by said sensing pins for unlatching said cam follower into engagement with said cam to initiate a cycle of reader operation and for relatching said cam follower out of engagement with said cam at the end of said cycle of reader operation.

17. A coded-information punched-card reader comprising an array of aperture sensing pins arranged to sense individual ones of a corresponding array of index-point code apertures of a punched card and individually spring biased toward aperture sensing position, a power-driven cam having a cyclic operation, a cam follower engageable with said cam and mechanically coupled to reciprocate a sensing-pin actuating plate to permit during each cycle of said cam spring-biased movement of said sensing pins from non-sensing to sensing position and for returning said pins by actuating-plate drive to said non-sensing position, an array of code-storage latchable elements coresponding to said array of sensing pins and adapted to be individually latchably engaged and drivingly moved from non-storage to code-storage position by power driven return movement of individual ones of any of said sensinig pins which sense a corresponding aperture in said card, thereby to store by the positioning of said elements the coded information sensed in each card read, cam-operated means operative at the outset of each cycle of said power-driven cam for unlatching all of said storage elements to non-storage position, cycle-control latch means operated by the manual positioning of a card in readiness to be read by said sensing pins for unlatching said cam follower into engagement with said cam to lock said card in said reading position while concurrently initiating a cycle of reader operation and for relatching said cam follower out of engagement with said cam and unlocking said card at the end of said cycle of reader operation, and means responsive to each interval of manual retention of said card in said reading position for maintaining said cam follower out of engagement with said cam following said cycle of reader operation to prevent initiation of a suceeding cycle of reader operation.

18. A coded-information punched-card reader comprising an array of aperture sensing pins arranged to sense individual ones of a corresponding array of index-point code apertures of a punched card, means including a reciprocally supported actuating plate for reciprocally supporting said sensing pins and for establishing a non-sensing position thereof, a plurality of latch members having an articulated connection with individual ones of said sensing pins and supported for reciprocal motion therewith, means for biasing said latch members both toward said sensing pins and toward a latching position to bias said sensing pins to said non-sensing position established by said actuating plate and toward code-aperture sensing positions, power driven means for reciprocating said actuating plate to permit biased movement of said latching members and sensing pins from said non-sensing position to said code-aperture sensing position and for returning said latching members and pins by bias opposing power drive to said non-sensing position, an array of code-storage elements corresponding to said array of sensing pins and having actuators positioned in latchable alignment with individual ones of said latching members when in said latching positions thereof, said actuators being individually latch engaged and drivingly moved by individual ones of said latch members from non-storage position to code-storage position by power driven return movement of individual ones of any of said latching members and sensing pins which sense a coresponding aperture in said card, thereby to store by the positioning of said elements the coded information sensed in each card read, and means operating in timed relation with movement of said sensing pins toward said sensing positions thereof for concurrently interrupting all latch engagements between said latch members and storage element actuators to permit all of said storage elements to return to non-storage position prior to movement of said sensing pins to said sensing positions thereof.

References Cited by the Examiner

UNITED STATES PATENTS

| | | | |
|---|---|---|---|
| 2,290,827 | 7/1942 | Thomas | 235—61.11 X |
| 2,323,824 | 7/1943 | Maschmeyer | 235—61.6 |
| 2,516,013 | 7/1950 | Mixer | 235—61.11 |

MAYNARD R. WILBUR, *Primary Examiner.*

DARYL W. COOK, *Assistant Examiner.*

UNITED STATES PATENT OFFICE
CERTIFICATE OF CORRECTION

Patent No. 3,304,411                                    February 14, 1967

Edwin O. Blodgett

It is hereby certified that error appears in the above numbered patent requiring correction and that the said Letters Patent should read as corrected below.

Column 2, line 11, for "drawing" read -- drawings --; line 50, for "conveniently" read -- conventionally --; line 58, for "Holderith" read -- Hollerith --; column 3, line 25, for "later" read -- latter --; column 6, line 44, for "adjustable" read -- adjustably --; column 11, line 18, for "biasing" read -- bias --; line 38, for "punch" read -- punched --; column 12, line 58, for "biasing" read -- bias --; column 15, line 19, after "of" insert -- code-storage elements corresponding to said array of --; column 16, line 38, for "sensinig" read -- sensing --; column 17, line 8, for "coresponding" read -- corresponding --.

Signed and sealed this 17th day of December 1968.

(SEAL)
Attest:

EDWARD M. FLETCHER, JR.                       EDWARD J. BRENNER
Attesting Officer                                      Commissioner of Patents